United States Patent [19]
Christensen

[11] 3,924,292
[45] Dec. 9, 1975

[54] ANTI-FLUTTER CASTER

[75] Inventor: Carl O. Christensen, Alamo, Calif.

[73] Assignee: Roll-Rite Corporation, Oakland, Calif.

[22] Filed: Dec. 9, 1974

[21] Appl. No.: 530,745

[52] U.S. Cl. ................................ 16/35 D; 16/35 R
[51] Int. Cl.² ........................................ B60B 33/00
[58] Field of Search .......... 16/35 R, 35 D, 18 R, 20, 16/23, 29, 37, 31 R, 31 A, 40

[56] References Cited
UNITED STATES PATENTS

| | | | |
|---|---|---|---|
| 2,445,865 | 7/1948 | Sledper | 16/35 R |
| 2,572,589 | 10/1951 | Bishop | 16/35 D |
| 3,518,714 | 7/1970 | Hager | 16/35 R |
| 3,828,392 | 8/1974 | Bolger | 16/35 R |

Primary Examiner—Geo. V. Larkin
Attorney, Agent, or Firm—Phillips, Moore, Weissenberger Lempio & Strabala

[57] ABSTRACT

The fluttering tendency of a caster wheel for warehouse trailers at high speeds, as well as the poor steerability of trucks or carts with four swivel casters, is controlled by providing the caster wheel with a resilient flutter-damping and aligning mechanism. The particular damping mechanism of this invention consists of a rubber-tired wheel which rides against flattened areas on the shank of the caster wheel yoke. There are normally two generally flattened areas so as to bias the caster wheel into alignment with the trailer's direction of motion. Alternatively, four generally flattened areas may be provided to permit installation of the wheel on any one of the four sides of the caster mounting bracket.

5 Claims, 6 Drawing Figures

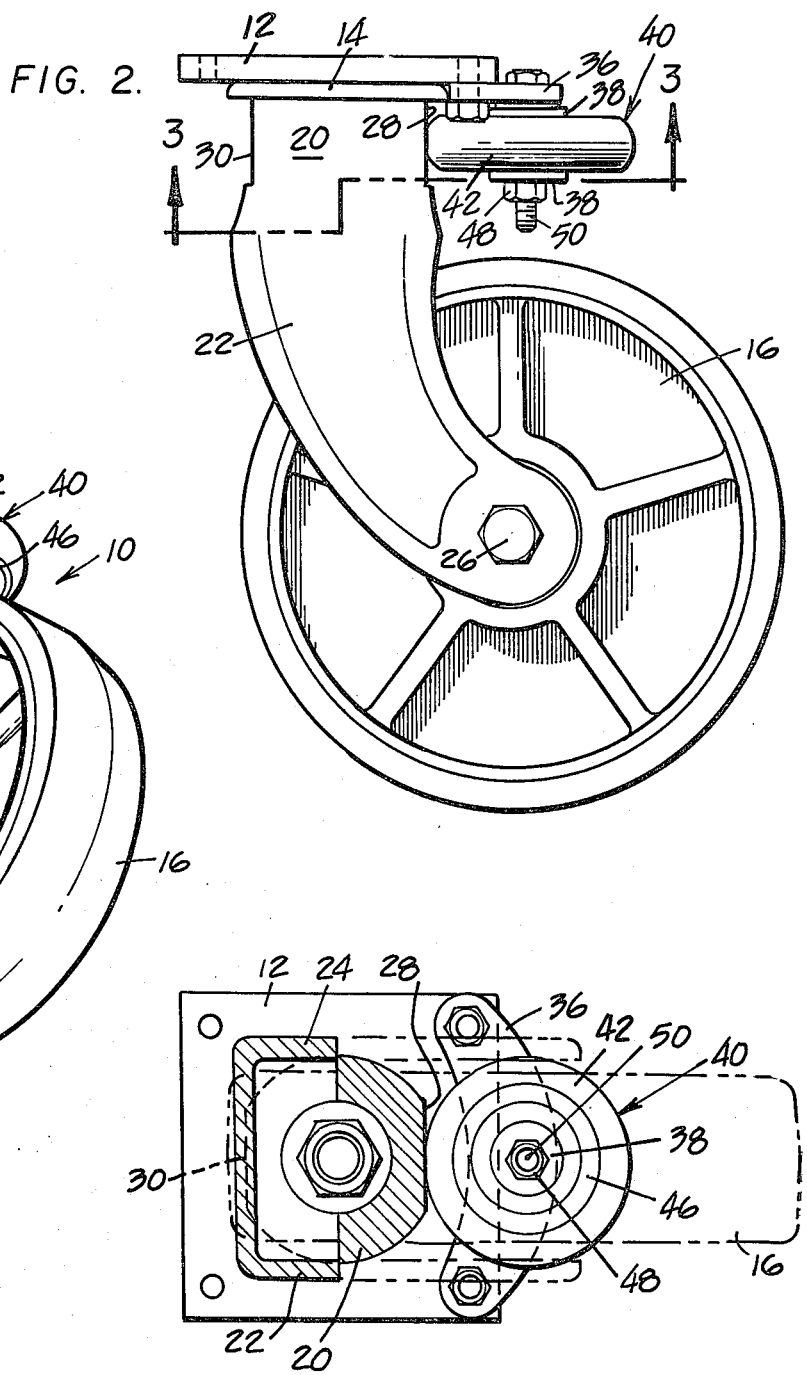

ANTI-FLUTTER CASTER

BACKGROUND OF THE INVENTION

It is advantageous, in a number of applications, to construct warehouse trailers with caster wheels on either or both ends. With recent improvements in trailer construction, it has become possible to tow this type of trailer at speeds in excess of 10 miles per hour over relatively rough surfaces. It has been found, under this type of use, that caster wheels will occasionally bounce off the ground at a rough spot on the pavement and flutter uncontrollably until an impact with another high spot on the pavement catches the wheel in a substantially sideways position and shears it off. Similarly, it is a well known fact that castered vehicles in which all four casters are swivel casters, such as hospital and department store trucks and stretchers, tend to have poor steerability and tend to wander off in a diagonal direction when improperly handled.

In correcting these problems, it is not sufficient to lock or essentially lock the caster wheel in the direction of motion, as this would impair the usefulness of the caster wheel as a pivoting support. Ideally, it is necessary to oppose deviation from the direction of travel to an increasing degree as the deviation gets larger, and yet to permit unrestricted pivoting of the caster once the deviation has become sufficiently large to indicate that the caster is making a purposeful turn.

SUMMARY OF THE INVENTION

The invention meets the foregoing criteria in a simple manner by providing biasing means for resiliently biasing, but not locking, the swivel caster wheel into one or more predetermined angular positions. Although the biasing can be accomplished in a number of different ways, as for example by some type of cam arrangement, a preferred form of the invention provides particularly satisfactory biasing by attaching, to the mounting plate of the caster, a rubber-tired wheel revolving about a vertical axis and bearing resiliently against the shank of the yoke of the caster wheel. The shank has flattened surfaces formed thereon, so that the resiliency of the rubber-tired anti-flutter wheel will tend to bias the caster wheel into a predetermined aligned position. As the caster wheel begins to turn, the gradual compression of the rubber tire of the anti-flutter wheel provides an ever-increasing force opposing the deviation of the caster wheel from its aligned position. However, when the caster wheel turns sufficiently for the anti-flutter wheel to reach the end of the flattened surface, the tire of the anti-flutter wheel rides up onto the cylindrical surface of the shank, no further compression occurs, and the caster wheel is free to turn all the way to some other position.

It is therefore the object of the invention to prevent fluttering of a caster wheel at high speeds.

It is another object of the invention to improve the steerability of four-swivel castered vehicles.

It is a further object of the invention to accomplish the foregoing objectives without materially impairing the normal castering action of the caster. These and other objects will become apparent from the following description taken in connection with the accompanying drawings.

BRIEF DESCRIPTION OF THE DRAWINGS

FIG. 1 is a perspective view of the caster of this invention;

FIG. 2 is a side elevation of the caster of FIG. 1;

FIG. 3 is a sectional view of the caster of FIG. 2 along line 3—3 of FIG. 2;

DESCRIPTION OF THE PREFERRED EMBODIMENT

Figure 4:
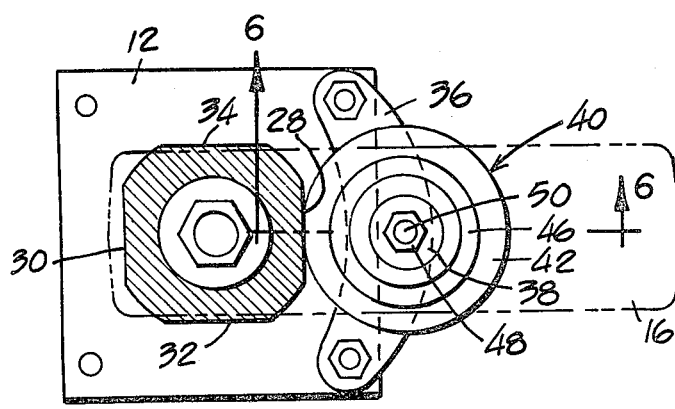
FIG. 4 is a view similar to FIG. 3 but showing an alternative embodiment of the invention.
Figure 5:
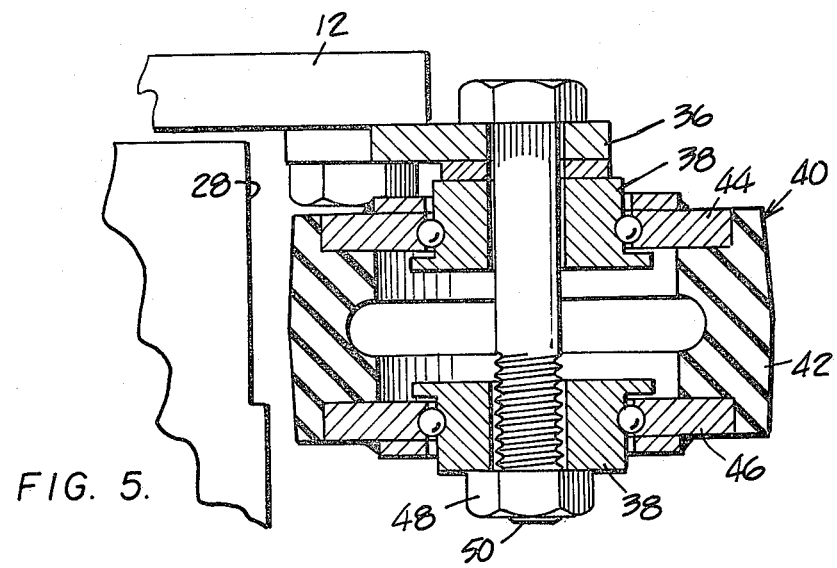
FIG. 5 is a partial vertical section showing the anti-flutter wheel prior to stressing.
Figure 6:
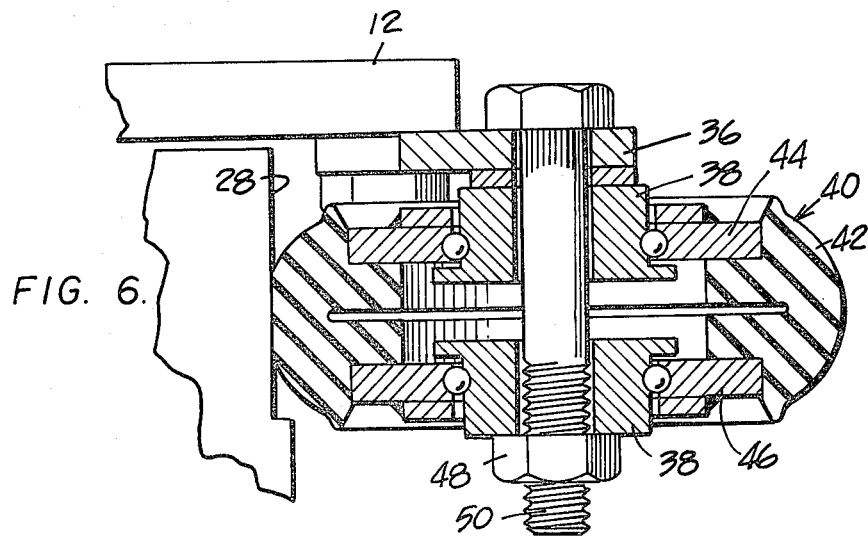
FIG. 6 is a section similar to FIG. 5 but showing the anti-flutter wheel after stressing.

In the drawings, the caster of this invention is generally shown at 10. Its conventional portions are a mounting plate 12, a bearing 14, and a caster wheel 16 supported from bearing 14 by a yoke 18 consisting of a generally cylindrical shank 20 from which a pair of curved forks 22, 24 extend downwardly and rearwardly (with respect to the direction of motion) to support the axle 26 of the caster wheel 16.

In accordance with a preferred embodiment of the invention, the shank 20 is provided with flat surfaces 28, 30 (FIGS. 2–4) and 32, 34 (FIG. 4). A bracket 36 is mounted to the mounting plate 12 in the position as shown in FIGS. 2–4. The bracket 36 supports a bearing 38 in which an anti-flutter wheel 40 is journaled. In the preferred embodiment of the invention, the anti-flutter wheel 40 consists of a cylindrical tire 42 of cushion rubber compressed between two pressure plates 44, 46. A nut 48 is provided in the threaded shaft 50 to apply axial pressure to the tire 42. When this is done, the cushion rubber material of the tire 42 bulges out radially and bears, with an adjustable degree of resilience, against the shank 20 and particularly against the flat surfaces 28 through 34.

It will be understood that the invention basically requires only a single flat surface 28 (for a vehicle designed essentially to move always in the same direction), or a pair of opposed flat surfaces 28, 30 (for a vehicle designed to move forward and backwards). Four flat surfaces 28, 30, 32, 34 are provided in the embodiment of FIG. 4 so that the bracket 36 may be mounted in either the solid-line position or in a position where the anti-flutter wheel 40 can engage surfaces 30, 32, or 34 as its preferred surface, at the user's option. Whenever a flat surface such as 28 is so positioned that the anti-flutter wheel 40 engages it when the caster wheel is properly aligned in the direction of motion, the caster wheel will be effectively biased into the direction of motion and will be prevented from wildly fluttering from side to side when it is rapidly drawn over an uneven surface.

When the caster turns sufficiently to cause the tire 42 of the anti-flutter wheel 40 to ride off the flattened surface 28 and onto the cylindrical portion of shank 20, no further compression of the tire 42 occurs. Consequently, and inasmuch as the anti-flutter wheel 40 is journaled for free motion in the bearing 38, the mechanism then causes no further opposition to the pivoting movement of the caster wheel, so as to leave the caster free to follow a tight curve or accommodate a reversal of the direction of motion.

The four-surface arrangement of FIG. 4 is particularly useful in four-swivel castered carts such as hospital and department store carts or stretchers. In this type of application, it keeps the front wheels of the cart (in the direction of motion) from going off at an angle when the cart is being pushed along a straight aisle; yet it freely allows manual operation in a transverse or any angular direction without mechanically engaging or disengaging any locking device.

Although the invention has been described herein in terms of a rubber-tired anti-flutter wheel, whose adjustability is of particular advantage in four-swivel castered carts, it will be realized that the basic advantages of the invention can be realized with other mechanisms, such as for example a cam or spring-biased roller arrangement, so long as the mechanism exerts a progressive biasing action rather than a locking action.

What is claimed is:

1. A flutter-resistant caster, comprising:
   a. mounting means;
   b. caster wheel means including a generally cylindrical shank having a cylindrical portion and being pivotally movable with respect to said mounting means and having at least one surface of lesser curvature than said cylindrical portion formed thereon; and
   c. anti-flutter means including biasing means for resiliently engaging said shank in such a manner as to bear alternately against said at least one surface or against said cylindrical portion of said shank, depending upon the pivotal position of said shank with respect to said mounting means.

2. The caster of claim 1, in which said at least one surface is substantially flat.

3. The caster of claim 2, in which said biasing means includes a resilient wheel, said wheel being mounted for substantially free rotation.

4. The caster of claim 3, in which said resilient wheel comprises a generally cylindrically element of resilient material, and adjustable compression means for compressing said generally cylindrical element so as to adjustably deform it radially outwardly into contact with said shank.

5. A self-aligning caster comprising:
   a. swivel mounting means for mounting a caster wheel to a support in pivotable relationship thereto; and
   b. progressive biasing means including resilient means for engaging said moutning means and for gradually biasing said caster wheel into a predetermined position with respect to said support as it approaches said position, and for allowing free swiveling movement of said caster wheel when it departs substantially from said predetermined position.

* * * * *